2,734,039

VULCANIZATION OF BUTYL RUBBER WITH A DIMETHYLOL PHENOL, CHLOROSULFONATED POLYTHENE AND A ZINC COMPOUND, AND PRODUCT OBTAINED THEREBY

Lester C. Peterson and Harvey J. Batts, Indianapolis, Ind., assignors to United States Rubber Company, New York, N. Y., a corporation of New Jersey No Drawing. Application December 30, 1952,
Serial No. 328,788

17 Claims. (Cl. 260—19)

This invention relates to a process for modifying Butyl rubber, and more particularly it relates to a process for accelerating the reaction between Butyl rubber and dimethylol phenols, as well as to improved products obtained thereby.

A copending application of Tawney and Little, Serial No. 266,146, filed January 12, 1952, now Patent No. 2,701,895 discloses and claims the vulcanization of Butyl rubber with dimethylol phenols. It has been desired to render the vulcanization of Butyl rubber with dimethylol phenols more convenient and more economical, by reducing the time and temperature necessary to attain a practical cure by this method. Accordingly, the principal object of the present invention is to provide a method of accelerating the aforesaid vulcanization process.

Another object of the invention is to provide improved vulcanizates based upon Butyl rubber vulcanized with dimethylol phenols, having enhanced resistance to deterioration after prolonged use, especially at elevated temperatures and in the presence of steam or oxygen.

In copending application Serial No. 330,052 of Schaefer, Batts and Brafford filed January 26, 1953, the acceleration of the reaction between dimethylol phenol and Butyl rubber by means of chlorosulfonated polythene is shown and claimed. We have now discovered that such acceleration with chlorosulfonated polythene is greatly enhanced by the presence of a small amount of a zinc compound, usually zinc oxide or its known equivalent, such as a zinc salt of a fatty acid (e. g., zinc stearate or zinc laurate). When such a zinc compound is present in the reaction mix of Butyl rubber, dimethylol phenol, and chlorosulfonated polythene, the process is remarkably accelerated, and excellent cures can be obtained in a considerably shorter time, or at lower temperature, than would otherwise be possible.

Butyl rubber, as is well known, is the type of synthetic rubber made by copolymerizing an isoolefin, usually isobutylene, with a minor proportion of a multi-olefinic unsaturate having from 4 to 14 carbon atoms per molecule. The isoolefins used generally have from 4 to 7 carbon atoms, and such isomonoolefins as isobutylene or ethyl methyl ethylene are preferred. The multi-olefinic unsaturate usually is an aliphatic conjugated diolefin having from 4 to 6 carbon atoms, and is preferably isoprene or butadiene. Other suitable diolefins that may be mentioned are such compounds as piperylene; 2,3-dimethyl butadiene-1,3; 1,2-dimethyl butadiene-1,3; 1,3-dimethyl butadiene-1,3; 1-ethyl butadiene-1,3; and 1,4-dimethyl butadiene-1,3. The Butyl rubber contains only relatively small amounts of copolymerized diene, typically from about 0.5 to 5%, and seldom more than 10%, on the total weight of the elastomer. For the sake of convenience and brevity, the various possible synthetic rubbers within this class will be designated generally by the term Butyl rubber.

In accordance with the preferred practice of the invention, the Butyl rubber is compounded for vulcanization with a dimethylol phenol as the curing agent, using chlorosulfonated polythene rubber as the accelerator, along with the zinc compound. The dimethylol phenol curing agents are known materials. The dimethylol phenol employed may be essentially a monomeric material, or it may be a polymeric material formed by self-condensation of the dimethylol phenol to yield a heat-reactive, oil-soluble, resinous product. Such resinous polymeric dimethylol phenols are the preferred materials for use in manufacturing the puncture-sealant from Butyl rubber in accordance with the method of the invention. Mixtures of the resinous polymeric dimethylol phenols with more or less of low molecular weight or monomeric dimethylol phenols are also useful. For convenience, the term dimethylol phenol will be used to refer to any of the monomeric or polymeric compounds, or to mixtures thereof, unless otherwise stated. The polymeric dimethylol phenols are well known resinous materials, frequently used in making varnishes and the like. They are generally solids and are therefore more convenient to handle than the monomeric dimethylol phenols, which are frequently liquids in the crude form, and tend to be malodorous and lachrymatory. The resinous dimethylol phenols are also more effective in producing the desired physical properties in the Butyl.

As will be understood by those skilled in the art, the dimethylol phenols are typically made by reacting a para-substituted phenol having the two ortho positions unoccupied, with a considerable molar excess of formaldehyde, the molar ratio of formaldehyde to phenol typically being 2:1, in the presence of a strong alkaline catalyst, especially an alkali metal hydroxide, which is subsequently neutralized. Typically the mixture of the phenol, formaldehyde and alkaline catalyst is heated at a suitable temperature, e. g., 25–100° C., the first stage of the reaction involving formation of the phenol methylol, i. e., the para-substituted-2,6-dimethylol phenol. This material, which is a phenol dialcohol, can be isolated by acidification of the mixture and separation of the oily layer which can then be advanced to higher molecular weight form by heating at say 75–175° C. This higher molecular weight form is oil-soluble and heat-reactive, and has the advantages that it is more reactive with the Butyl rubber than the lower molecular weight form. Separation of the phenol dialcohol can be omitted, in which case the reaction is carried past the monomer stage to the resinous stage, whereupon the mixture is neutralized and water is removed to give the resinous material. In any case care should be taken to stop while the resin is in the soluble (in conventional organic solvents and drying oils) and fusible state. This is the resol type of resin.

The phenol from which the dimethylol phenol is made generally has a hydrocarbon group in the position para to the phenolic hydroxyl, examples being alkyl groups, especially alkyl groups having from 3 to 20 carbon atoms, tertiary-butyl and tertiary-octyl (alpha, alpha, gamma, gamma-tetramethyl butyl) being especially preferred among the lower alkyls (8 carbon atoms or less), cycloalkyl groups, aryl groups such as phenyl, and aralkyl groups such as benyl and cumyl. We believe that the tertiary-butyl and the aforementioned branched octyl are outstanding. Examples of suitable dimethylol phenols that may be used in the invention either in the polymeric or monomeric form are as follows:

2,6-dimethylol-4-methyl phenol
2,6-dimethylol-4-tertiary-butyl phenol
2,6-dimethylol-4-octyl phenol
2,6-dimethylol-4-dodecyl phenol
2,6-dimethylol-4-phenyl phenol
2,6-dimethylol-4-benzyl phenol
2,6-dimethylol-4-(alpha, alpha-dimethyl benzyl) phenol
2,6-dimethylol-4-cyclohexyl phenol The dimethylol phenol is preferably employed in amount within the range of from about 4 to 15 parts by weight to 100 parts of the Butyl rubber. While smaller amounts of the dimethylol phenol may be used, e. g., 3 parts, it is usually found that less than this amount is insufficient to produce a practical cure within a reasonable time. However if a less full reaction is all that is involved, very small amounts may be used, as will be more fully explained below. Also, larger amounts may be used, e. g., 20 parts, but amounts greater than this are without further advantage.

The rubbery chlorosulfonated polythene used as accelerator is also a commercially available elastomer, marketed under the trade name Hypalon S-2. Usually at least 1 part, and preferably from about 2 to 10 parts by weight of the chlorosulfonated polythene are admixed with 100 parts of the Butyl. The remarkably short cures and improved physical properties obtained in the present system are particularly unexpected in view of the fact that the chlorosulfonated polythene will not itself be cured by a dimethylol phenol.

As little as 1 part by weight of zinc oxide or its equivalent, per 100 parts of Butyl, definitely increases the accelerating effect of the chlorosulfonated polythene while amounts as great as from 2.5 to 5 parts of zinc oxide produce a very marked effect. For most purposes, there is generally no advantage in using more than 10 or 15 parts of zinc oxide to aid the chlorosulfonated polythene acceleration of the dimethylol phenol cure.

For purposes of making such articles as curing bags or inner tubes there is generally included in the mixture a quantity of a suitable reinforcing material, preferably carbon black. Although from at least about 20 to 100 parts by weight of carbon black may be employed per 100 parts of the Butyl rubber, it is generally preferred to use from about 40 to 80 parts of black, and most preferably about 50 or 60 parts. Other compounding ingredients, such as other fillers, processing aids, etc., may be included in the mixture desired.

The Butyl rubber, dimethylol phenol, chlorosulfonated polythene, zinc compound and additional ingredients may be mixed together in any desired order according to the procedure ordinarily used in mixing rubber compounds, with the aid of the usual rubber mixing equipment such as a Banbury mixer or roll mills.

The vulcanizable mixture resulting from the foregoing ingredients may be fabricated into the desired form by the usual methods, such as calendering, extrusion, or molding, and subsequently vulcanized by heating, preferably while confined under pressure.

The curing process of the invention is conveniently carried out at temperatures of 200° F. or more, and preferably at temperatures in excess of 300° F., for periods of time ranging from about ¼ to 3 hours, the longer periods of time within the stated time range being employed with the lower temperatures. The most preferred vulcanizing temperatures are within the range of about 320° to 370° F., although somewhat higher temperatures may be employed, e. g., 390° or 400° F., provided such highly elevated temperatures are not maintained for a sufficiently long time to cause thermal injury to the article.

The following example will serve to illustrate the invention in more detail.

EXAMPLE

A number of stocks were made up by mixing the materials shown in Table I in the stated amounts, following which the stocks were cured for varying times as indicated, and the properties of the resulting vulcanizates were measured, with the results noted in the table. The GR-I 18 is a commercial grade of synthetic rubber made by copolymerizing isobutylene and isoprene and containing about 2½% of combined isoprene. The Hypalon

*Table I*

| Ingredients (parts by weight) | | A | B | C | D | E | F |
|---|---|---|---|---|---|---|---|
| GR-I 18 | | 100 | 100 | 100 | 100 | 100 | 100 |
| ST-137 Resin | | 12 | 12 | 12 | 12 | 12 | 12 |
| Philblack O (High abrasion furnace black) | | 60 | 60 | 60 | 60 | 60 | 60 |
| Hypalon S-2 | | | 3 | 3 | | 3 | |
| Zinc Oxide | | | | 3 | 3 | | |
| Zinc Stearate | | | | | | 3 | 3 |

| | Cure at 350° F. | A | B | C | D | E | F |
|---|---|---|---|---|---|---|---|
| Tensile Strength, p. s. i. | 5' | 115 | 790 | 1,060 | 175 | 1,610 | 465 |
| | 10' | 710 | 1,580 | 1,985 | 840 | 2,050 | 1,410 |
| | 15' | 1,165 | 1,955 | 2,160 | 1,010 | 2,200 | 1,805 |
| | 30' | 1,970 | 2,210 | 2,280 | 2,020 | 2,340 | 2,200 |
| | 45' | 2,160 | 2,250 | 2,370 | 2,220 | 2,300 | 2,320 |
| | 60' | 2,360 | 2,330 | 2,310 | 2,280 | 2,340 | 2,430 |
| Elongation at Break, percent | 5' | 1,100+ | 920 | 770 | 1,100+ | 720 | 910 |
| | 10' | 1,100+ | 650 | 620 | 1,020 | 500 | 850 |
| | 15' | 880 | 510 | 500 | 520 | 410 | 750 |
| | 30' | 670 | 460 | 400 | 670 | 310 | 570 |
| | 45' | 600 | 410 | 350 | 570 | 270 | 510 |
| | 60' | 510 | 380 | 340 | 520 | 250 | 500 |
| 300% Modulus, p. s. i. | 5' | 62 | 280 | 430 | 87 | 685 | 145 |
| | 10' | 185 | 825 | 1,045 | 250 | 1,360 | 415 |
| | 15' | 405 | 1,210 | 1,380 | 495 | 1,770 | 700 |
| | 30' | 865 | 1,530 | 1,804 | 960 | 2,280 | 1,240 |
| | 45' | 1,240 | 1,880 | 2,060 | 1,220 | | 1,455 |
| | 60' | 1,500 | 1,945 | 2,130 | 1,370 | | 1,550 |
| 500% Modulus, p. s. i. | 5' | 94 | 495 | 760 | 145 | 1,280 | 265 |
| | 10' | 340 | 1,430 | 1,855 | 480 | 2,050 | 850 |
| | 15' | 745 | 1,950 | 2,160 | 935 | | 1,395 |
| | 30' | 1,670 | | | 1,755 | | 2,120 |
| | 45' | 2,080 | | | 2,060 | | 2,300 |
| | 60' | 2,360 | | | 2,260 | | 2,430 |
| Hardness, Durometer, Shore A | 5' | 53 | 65 | 63 | 53 | 68 | 53 |
| | 10' | 59 | 70 | 72 | 60 | 73 | 57 |
| | 15' | 61 | 73 | 75 | 62 | 76 | 64 |
| | 30' | 65 | 77 | 80 | 66 | 80 | 65 |
| | 45' | 66 | 79 | 80 | 68 | 81 | 66 |
| | 60' | 68 | 80 | 80 | 70 | 82 | 67 |
| Hot Flow percent elongation under initial loading of 50 p. s. i. at 340° F.: | | | | | | | |
| 3 hrs | 15' | >170 | 23 | 15.4 | >170 | 10.8 | 85 |
| | 30' | 40.5 | 7.9 | 7.7 | 36.5 | 5.4 | 13 |
| 24 hrs | 15' | >170 | 38.5 | 20.5 | >170 | 10.8 | >170 |
| | 30' | >170 | 21 | 12.8 | >170 | 8.1 | >170 |

S-2 is a commercial elastomer composed of chlorosulfonated polythene. It is estimated to have a molecular weight of 30,000 and contains approximately 28% chlorine and 1.5% sulfur. These two elements are chemically combined with a hydrocarbon chain, with most of the chlorine substituted on the chain, and the sulfur is combined with chlorine and attached to the chain as sulfonyl chloride ($SO_2Cl$) groups. There is approximately one chlorine atom for every 6 or 7 carbon atoms, and one sulfonyl chloride for every 90 to 130 carbon atoms. The Amberol ST-137 is a commercial phonolic resin of the dimethylol phenol class, and it is believed to be made from about 1 mole of p-octyl phenol, 2 moles of formaldehyde and 1 mole of sodium hydroxide, the alkali being carefully neutralized after the condensation is complete.

It will be evident from the data of Table I that stock C, including chlorosulfonated polythene and zinc oxide, displayed greater acceleration than stock B which contained no zinc oxide, while stock A containing neither zinc oxide nor chlorosulfonated polythene cured even more slowly. This is particularly unexpected in view of the fact that, as shown by stock D, the zinc oxide did not produce any accelerating effect in the absence of the chlorosulfonated polythene. Also, stock E of the invention including chlorosulfonated polythene and zinc stearate was greatly accelerated, whereas zinc stearate alone did not produce acceleration in the absence of chlorosulfonated polythene, as indicated by stock F.

The results of the hot flow test, given at the lower portion of Table I, will reveal another important advantage of the invention, namely, the compositions including the zinc compound did not flow as much under the influence of continued application of stress at elevated temperature. The hot flow of the composition is an important factor in determining the utility of a vulcanizate for service at high temperatures, as in curing bags. A hot flow test is described in Industrial and Engineering Chemistry, November 1948, p. 2180.

We have further discovered that the inclusion of small amounts of the zinc compounds in the vulcanizates in accordance with the invention significantly improves their anti-oxidant chacteristics. To demonstrate the increased resistance to oxidation of the stocks including the zinc compounds, specimens of the several stocks of Table I were pre-cured in a slab mold for 15 minutes at 350° F. The slabs were then tested by heating in an air pressure cure mold, which has metal on one surface and air on the other. The heating was continued for 16 hours at 350° F. under a pressure of 100 p. s. i. This aging test was severe enough to cause complete degradation of the standard, as evidenced by the extremely poor tensile of the control stock A after aging. The results are given in Table II.

Table II

|  | A | B | C | D | E | F |
|---|---|---|---|---|---|---|
| Original: |  |  |  |  |  |  |
| Tensile | 1,165 | 1,955 | 2,160 | 1,010 | 2,200 | 1,805 |
| Elongation | 880 | 510 | 500 | 520 | 410 | 750 |
| Hardness | 61 | 73 | 75 | 62 | 76 | 64 |
| Aged as Specified: |  |  |  |  |  |  |
| Tensile | 170 | 365 | 1,395 | 120 | 1,000 | 120 |
| Elongation | 300 | 380 | 300 | 300 | 250 | 300 |
| Hardness | 48 | 75 | 78 | 55 | 80 | 35 |
| Percent of Original: |  |  |  |  |  |  |
| Tensile | 14.6 | 18.7 | 64.5 | 11.9 | 45.5 | 6.65 |
| Elongation | 34.1 | 74.5 | 60 | 57.7 | 61 | 40 |
| Hardness | 77.5 | 103 | 104 | 89 | 105 | 54.7 |

It will be seen from Table II that stocks C and E including the chlorosulfonated polythene and the zinc compound retained a greater percentage of their original properties than any of the other vulcanizates.

The improved vulcanizates of the invention can be used to great advantage in making useful articles, such as curing bags of the various known kinds, either for new tires or for re-treading tires, as well as in making hose, belts, inner tubes, especially heavy service inner tubes, and pneumatic tires, especially tire treads and side walls, as well as other objects. The enhanced resistance of the improved vulcanizates to oxidation and aging and the effects of high temperature results in improved service and longer life in articles constituted of the present vulcanizates.

The process of the invention has been described with particular reference to the use of zinc compounds along with chlorosulfonated polythene to accelerate the dimethylol phenol cure of Butyl rubber wherein it was desired to substantially complete the cure of the Butyl rubber. However, it will be understood that the accelerating effect of the zinc compound and chlorosulfonated polythene on the dimethylol phenol cure of rubber can be taken advantage of also in processes wherein only a limited or partial reaction between the Butyl rubber and the dimethylol phenol takes place. In such cases, the desired limited or partial reaction can be carried out in a shorter time, or at a lower temperature, by using the zinc compound and chlorosulfonated polythene as accelerator in accordance with the invention. Thus, for example, the partial curing reaction between Butyl rubber and limited amounts of dimethylol phenol, for example, 0.2 to 2.5 parts per 100 parts of Butyl rubber, carried out at temperatures of 200°–400° F. for from 5–45 minutes, can be effectively accelerated by the presence of a small amount of zinc compound and chlorosulfonated polythene as described. Butyl rubber partially cured with dimethylol phenol and the process of making the same are disclosed in more detail and claimed in co-pending application Serial No. 290,344 of Iknayan et al., filed May 27, 1952.

Having thus described our invention, what we claim and desire to protect by Letters Patent is:

1. In the method of chemically modifying a synthetic rubbery copolymer of an isoolefin having from 4 to 7 carbon atoms with from 0.5 to 10% of an aliphatic conjugated diolefin having from 4 to 6 carbon atoms by heating 100 parts of the said rubber at a temperature of from 200° to 400° F. for from 5 minutes to 4 hours in admixture with from 0.2 to 20 parts of a 2,6-dymethylol-4-hydrocarbon substituted phenol and from 1 to 10 parts of chlorosulfonated polythene, the improvement which comprises the step of carrying out the said chemical modification in the presence of 1 to 15 parts of a zinc compound selected from the group consisting of zinc oxide and zinc salts of fatty acids, the said zinc compound serving to accelerate the said chemical modification.

2. A method as in claim 1, in which the said dimethylol phenol is a resinous, oil-soluble, heat-reactive 2,4-dimethylol-4-lower alkyl substituted phenol.

3. A method of curing a synthetic rubbery copolymer of isobutylene with from 0.5 to 5% of isoprene comprising in combination the steps of admixing 100 parts of said rubber with from 3 to 15 parts of a 2,6-dimethylol-4-hydrocarbon substituted phenol and 2 to 10 parts of chlorosulfonated polythene, and, additionally, from 1 to 15 parts of a zinc compound selected from the group consisting of zinc oxide and zinc salts of fatty acids, and heating the resulting mixture at a temperature of from 300° F. to 400° F. for from ¼ to 3 hours to effect cure thereof, the said zinc compound serving to accelerate the said cure.

4. A method as in claim 3, in which the said dimethylol phenol is a resinous, oil-soluble, heat-reactive 2,6-dimethylol-4-lower alkyl substituted phenol.

5. A method as in claim 3, in which the said dimethylol phenol is resinous, oil-soluble, heat-reactive 2,6-dimethylol-4-tertiary butyl phenol.

6. A method as in claim 3, in which the said dimethylol phenol is resinous, oil-soluble, heat-reactive 2,6-dimethylol-4-octyl phenol.

7. A method as in claim 5 in which the said zinc compound is zinc oxide.

8. A method as in claim 6, in which the said zinc compound is zinc oxide.

9. A method as in claim 5, in which the said zinc compound is zinc stearate.

10. A method as in claim 6, in which the said zinc compound is zinc stearate.

11. A vulcanizate characterized by improved resistance to aging comprising 100 parts of a synthetic rubbery copolymer of an isoolefin having from 4 to 7 carbon atoms with from 0.5 to 10% of an aliphatic conjugated diolefin having from 4 to 6 carbon atoms vulcanized with from 3 to 15 parts of a 2,6-dimethylol-4-hydrocarbon substituted phenol and accelerated with from 1 to 10 parts of chlorosulfonated polythene and from 1 to 15 parts of a zinc compound selected from the group consisting of zinc oxide and zinc salts of fatty acids.

12. A vulcanizate as in claim 11, in which the said dimethylol phenol is a resinous, oil-soluble, heat-reactive 2,6-dimethylol-4-lower alkyl substituted phenol.

13. A vulcanizate as in claim 11, in which the said dimethylol phenol is resinous, oil-soluble, heat-reactive 2,6-dimethylol-4-tertiary butyl phenol.

14. A vulcanizate as in claim 11, in which the said dimethylol phenol is resinous, oil-soluble, heat-reactive 2,6-dimethylol-4-octyl phenol.

15. A vulcanizate as in claim 12, in which the said zinc compound is zinc oxide.

16. A vulcanizate as in claim 12, in which the said zinc compound is zinc stearate.

17. A vulcanizate characterized by improved resistance to aging comprising 100 parts of a synthetic rubbery copolymer of isobutylene with from 0.5 to 5% of isoprene, vulcanized with from 3 to 15 parts of a resinous, oil-soluble, heat-reactive 2,6-dimethylol-4-hydrocarbon substituted phenol and accelerated with from 2 to 10 parts of chlorosulfonated polythene and from 1 to 15 parts of a zinc compound selected from the group consisting of zinc oxide and zinc salts of fatty acids.

References Cited in the file of this patent

Ser. No. 357,662, Wildschut (A. P. C.), published Apr. 20, 1943.

Rubber Age, May 1952, pages 205–221.